United States Patent
Copeland

(10) Patent No.: US 8,011,641 B2
(45) Date of Patent: Sep. 6, 2011

(54) CARBURETTORS

(75) Inventor: James Copeland, Shoreham-by-Sea (GB)

(73) Assignee: Ricardo UK Limited, Shoreham-by-Sea (GB)

(*) Notice: Subject to any disclaimer, the term of this patent is extended or adjusted under 35 U.S.C. 154(b) by 309 days.

(21) Appl. No.: 12/374,551

(22) PCT Filed: Jul. 20, 2007

(86) PCT No.: PCT/GB2007/002797
§ 371 (c)(1),
(2), (4) Date: Apr. 16, 2009

(87) PCT Pub. No.: WO2008/009976
PCT Pub. Date: Jan. 24, 2008

(65) Prior Publication Data
US 2009/0315195 A1    Dec. 24, 2009

(30) Foreign Application Priority Data
Jul. 21, 2006   (GB) .................................. 0614559.3

(51) Int. Cl.
*F02M 13/04*    (2006.01)
(52) U.S. Cl. ........ 261/23.3; 123/73 PP; 261/46; 261/47; 261/DIG. 1
(58) Field of Classification Search .............. 123/73 PP; 261/23.2, 23.3, 46, 47, 55, 56, DIG. 1
See application file for complete search history.

(56) References Cited

U.S. PATENT DOCUMENTS

| | | | | |
|---|---|---|---|---|
| 2,179,143 A | * | 11/1939 | Brown | 123/274 |
| 3,205,879 A | * | 9/1965 | Von Seggern et al. | 123/581 |
| 4,479,470 A | * | 10/1984 | Ishida | 123/308 |

(Continued)

FOREIGN PATENT DOCUMENTS

DE    10326488 A1    4/2004

(Continued)

OTHER PUBLICATIONS

International Search Report for PCT/GB2007/002797 dated Oct. 23, 2007.
Great Britain Search Report for GB0614559.3 dated Nov. 3, 2006.

*Primary Examiner* — Richard L Chiesa
(74) *Attorney, Agent, or Firm* — Harry K. Ahn; Abelman Frayne & Schwab

(57) ABSTRACT

A carburettor includes a flow duct (4) including rich (8) and lean (10) passages in parallel, through which, in use, air flows and which are separated by a substantially planar partition (6). At least one fuel jet (12, 14, 16) communicates with the rich passage (8). The partition (6) includes a circular aperture (20). A butterfly valve (24) is mounted on a pivotal shaft (22) to be pivotable between a closed position, in which the flow duct (4) is substantially closed, and an open position, in which the flow duct is substantially open. The pivotal shaft (22) extends perpendicular to the plane of the partition (6). The pivotal shaft (22) carries a circular obturator disc (26), whose diameter is substantially equal to that of the aperture (20) and which is received in the aperture (20) and substantially closes the aperture (20) at all positions of the butterfly valve (24).

1 Claim, 3 Drawing Sheets

U.S. PATENT DOCUMENTS

| | | | | |
|---|---|---|---|---|
| 6,101,991 | A * | 8/2000 | Glover | 123/73 PP |
| 6,889,637 | B2 * | 5/2005 | Rosskamp | 123/73 PP |
| 7,261,281 | B2 * | 8/2007 | Raffenberg | 261/44.8 |
| 2005/0188952 | A1 | 9/2005 | Prager | |
| 2006/0131763 | A1 * | 6/2006 | Raffenberg | 261/43 |
| 2006/0163755 | A1 * | 7/2006 | Prager | 261/46 |

FOREIGN PATENT DOCUMENTS

| | | | |
|---|---|---|---|
| GB | 2404950 A | 2/2005 | |
| JP | 57-83651 A * | 5/1982 | 261/23.3 |
| WO | WO 99/58829 A | 5/1999 | |
| WO | WO 2005/026520 A | 3/2005 | |

* cited by examiner

CARBURETTORS

CROSS REFERENCE TO RELATED APPLICATIONS

This application is a national phase of PCT application No. PCT/GB2007/002797, filed Jul. 20, 2007, which claims priority to GB patent application No. 0614559.3, filed Jul. 21, 2006, all of which are incorporated herein by reference.

The present invention relates to carburettors of the type disclosed in WO99/58829. Such carburettors are intended for use with two-stroke engines whose inlet duct is divided into two separate passages, referred to as a rich passage and a lean passage.

The carburettor disclosed in WO99/58829 is arranged to direct a rich fuel/air mixture into the rich passage and a weak mixture or substantially pure air into the lean passage at high engine load, when the carburettor butterfly valve is substantially fully open, but to direct a substantially equally rich mixture into both the rich and lean passages, when the butterfly valve is substantially closed. The engine thus operates with an inhomogeneous or stratified charge at high load and a substantially homogeneous charge at low load.

The advantages as regards emissions of operating with a stratified charge are of course well known. Theoretically, it would be desirable for the engine to operate with a stratified charge under all operating conditions, that is to say under both high and low load conditions. However, the carburettor disclosed in the prior document referred to above is intended primarily for use with very small two-stroke engines, such as those which are used in small hand-held device, such as trimmers and chainsaws, and it is found that such engines will not operate satisfactorily with a stratified charge under low load conditions. It is therefore necessary for such engines to operate with at least approximately homogeneous charging under low load conditions. The carburettor of the prior document therefore provides the optimum charging conditions for very small two-stroke engines consistent with both maintaining polluting emissions of unburnt hydrocarbons and nitrogen oxides at the minimum practicable level and ensuring that the engine operates satisfactorily under all running conditions.

However, at least some larger two-stroke engines are capable of operating satisfactorily with stratified charging even at very low load and if such an engine is provided with a carburettor of the type referred to above its polluting emissions are not at the minimum practicable level because further improvements could be obtained by operating the engine with stratified charging at low load as well as high load. Thus the carburettor referred to above not only supplies fuel into the lean passage at low engine load but it is also found that, due to pressure fluctuations and transient backflow in the inlet duct, a certain amount of fuel gets into the lean passage even under partial load conditions, thereby degrading the emissions performance of the engine.

It is therefore the object of the invention to provide a carburettor of split flow type which will result in the reduction of the pollutant emissions of larger two-stroke engines to the minimum practicable level or at least to a level significantly below that which would be obtained with a carburettor of the type disclosed in WO99/58829.

According to the present invention, a carburettor of the type including a flow duct comprising rich and lean flow passages in parallel, through which, in use, air flows and which are separated by a substantially planar partition, at least one fuel jet communicating with the rich passage, the partition including a substantially circular aperture, and a butterfly valve mounted on a pivotal shaft and pivotable between a closed position, in which the flow duct is substantially closed, and an open position, in which the flow duct is substantially open, is characterised in that the pivotal shaft extends transversely to the plane of the partition and that the pivotal shaft carries a substantially circular obturator disc, whose diameter is substantially equal to that of the aperture and which is received in the aperture and substantially closes the aperture at all positions of the butterfly valve.

Thus the carburettor of the present invention is generally similar to that disclosed in the prior document but differs from it in two important respects. In the carburettor disclosed in the prior document, the pivotal valve shaft extends parallel to the plane of the partition and lies substantially in the plane of the partition. The butterfly valve which it carries therefore substantially closes the aperture in the partition, when the valve is in the open position and the flow duct is substantially unobstructed, but leaves the aperture substantially open, when the valve is in its closed position and thus substantially closes the flow duct. In the carburettor of the present invention, by contrast, the pivotal shaft extends transversely, e.g. perpendicularly, to the plane of the partition and in practice its axis will pass through the centre of the circular aperture in the partition. The butterfly valve plate which it carries will extend through the aperture in the partition but will never close that aperture because its plane is perpendicular to that of the aperture. In addition to the butterfly valve disc, the pivotal shaft of the carburettor in accordance with the present invention also carries an obturator disc and in practice the plane of this disc will be perpendicular to that of the valve disc. The obturator disc is circular and has a diameter substantially equal to that of the aperture and is received in the aperture and is therefore in practice substantially contiguous with the planar partition. Although rotation of the pivotal shaft will move the valve disc between the open and closed positions, such rotation will not alter the position of the obturator disc, which therefore substantially blocks the aperture in the partition at all positions of the valve disc. This means in practice that the rich and lean passages in the carburettor are effectively substantially sealed from one another at all times and thus that fuel, which is injected only into the rich passage, cannot gain access to the lean passage at all. The lean passage therefore conducts substantially pure air at all times and this will mean that the charge in the cylinders of the engine to which the carburettor is connected will be sharply stratified at all operating speeds and loads of the engine. This will enable scavenging of the engine, which in practice will be a two-stroke loop scavenged engine, to be conducted with substantially pure air under all operating conditions, whereby substantially no unburnt hydrocarbons escape to the atmosphere. The fact that stratified charging is employed at all engine loads will mean that the emission of unburned hydrocarbons to the atmosphere is also minimised.

Further features and details of the invention will be apparent from the following description of one specific embodiment which is given by way of example only with reference to the accompanying highly diagrammatic drawings, in which.

Figure 1:
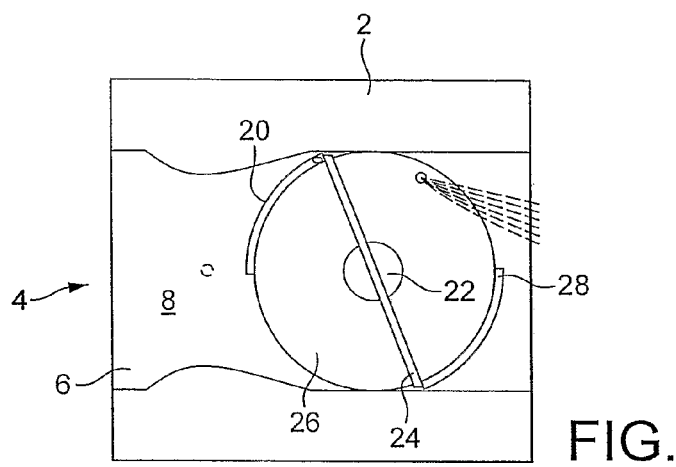
FIGS. 1, 2 and 3 are sectional views of a carburettor in accordance with the invention in plan view, side view and end view, respectively, when operating under low load or idling conditions.
Figure 2:
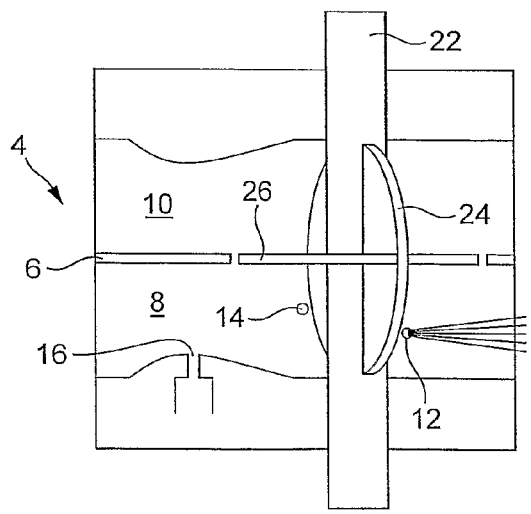
Figure 3:
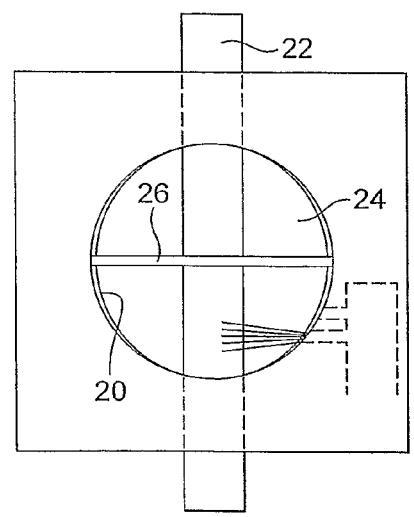
Figure 4:
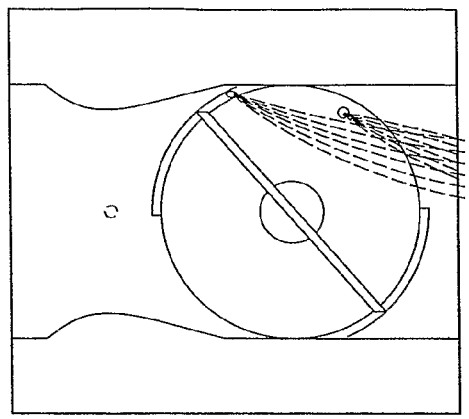
FIGS. 4 to 6 are views corresponding to FIGS. 1 to 3, respectively, showing the carburettor under medium load conditions.
Figure 5:
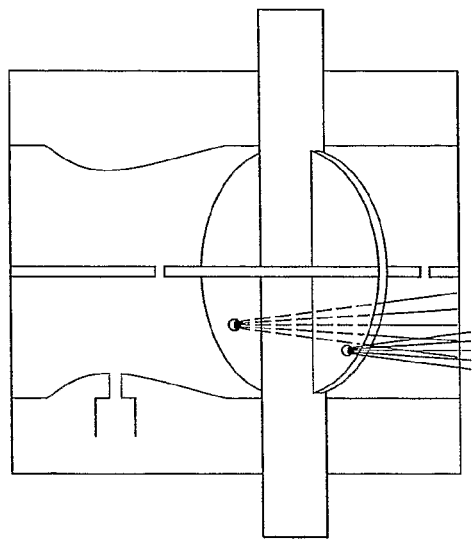
Figure 6:
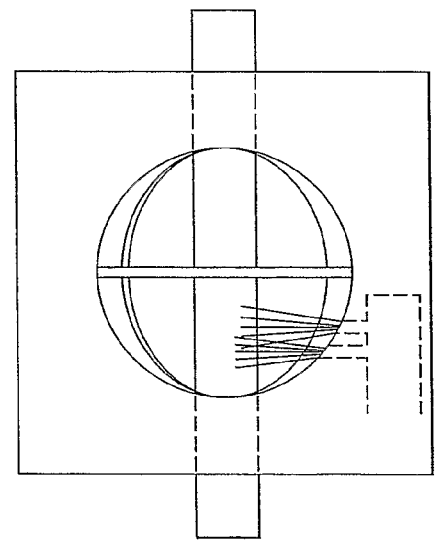
Figure 7:
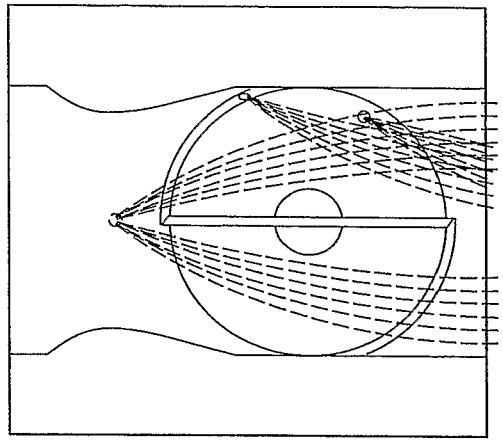
FIGS. 7 to 9 are views of the carburettor which again correspond to FIGS. 1 to 3, respectively, under high load conditions.
Figure 8:
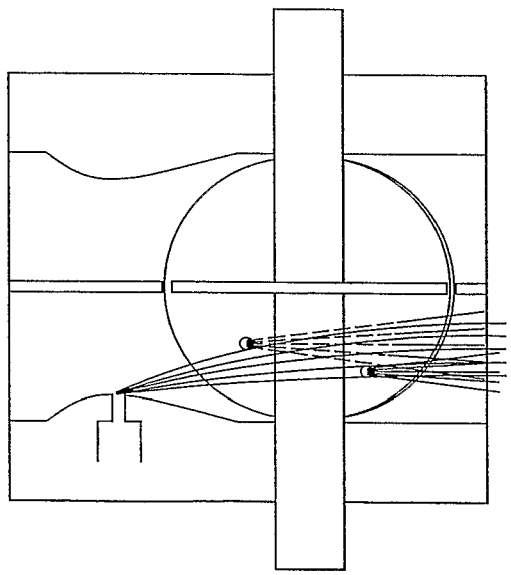
Figure 9:
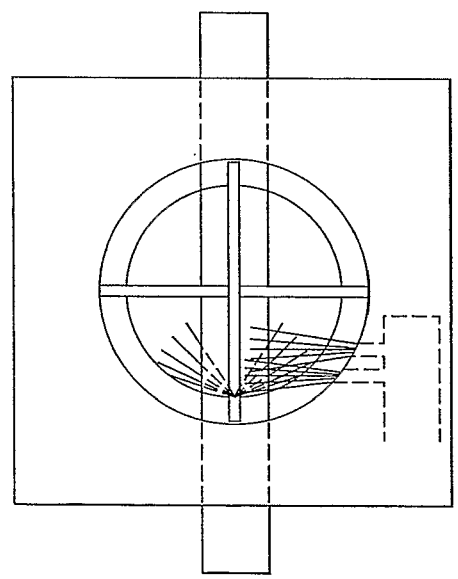

Referring firstly to FIGS. 1 to 3, the carburettor includes a body 2 which defines a flow duct 4. Extending within the duct 4 in the direction of its length is a substantially planar partition 6, which divides the duct 4 into two flow passages, a rich passage 8 and a lean passage 10. Communicating with the rich passage 8 is at least one fuel jet, in this case three fuel jets, namely an idle jet 12, an intermediate jet 14 and a main jet 16. Formed in the partition 6 and extending across its entire width is a substantially circular aperture 20. This aperture does in fact deviate slightly from the truly circular, as will be described in more detail below. Pivotally carried by the housing 2 and extending transversely to the length of the flow duct 4 and extending through its centre is a pivotal shaft 22. This shaft carries a butterfly valve comprising a circular valve disc 24 whose diameter is substantially equal to that of the flow duct, which is circular, at least at the position at which the valve disc 24 is received. The pivotal shaft 22 also carries a substantially planar obturator disc 26, the plane of which is perpendicular to that of the valve disc 24 and whose thickness is substantially equal to that of the partition 6. The obturator disc 26 is received in the aperture 20 and since its diameter is substantially equal to that of the aperture 20 it substantially closes the aperture. Rotation of the shaft 22 will result in movement of the valve disc 24 from the closed position, in which the flow duct 4 is substantially closed, as shown in FIGS. 1 to 3, through an intermediate position, in which the flow duct 4 is partially open, as shown in FIGS. 4 to 6, to an open position, in which the valve disc 24 extends parallel to the length of the flow duct and the flow duct is thus substantially unobstructed, as shown in FIGS. 7 to 9.

As mentioned above, the aperture 20 differs slightly from the truly circular and instead of constituting a single truly circular opening, it comprises two juxtaposed semicircular openings, which are offset slightly in the longitudinal direction of the duct 4. This results in the periphery of the opening 20 affording two oppositely directed shoulders 28. These shoulders 28 can act in the manner of an end stop and are engaged by the free edges of the valve disc 24, when in the fully open position. This prevents the valve disc inadvertently being moved to a position beyond the fully open position, in which its plane is parallel to the length of the flow duct 4.

As shown in FIGS. 1 to 3, when the engine to which the carburettor is connected is operating under low load or idling conditions, the valve disc 24 is in the closed position, in which it substantially blocks the flow duct 4, that is to say both the rich and lean passages 8, 10. The air flow rate through the rich passage 8 is sufficient to withdraw fuel only from the idle jet 12. Substantially pure air flows through the lean passage 10. Under medium load conditions, the valve disc 24 moves to the partially open position shown in FIGS. 4 to 6. The air flow rate is now sufficient to draw fuel from both the idle jet 12 and the intermediate jet 14. All of this fuel, however, remains in the rich passage due to the fact that the opening 20 is substantially closed by the obturator disc 26. Under full load operation, as shown in FIGS. 7 to 10, the air flow rate is sufficient to draw fuel from all three fuel jets. However, as before, all the fuel remains in the rich passage. If there should be substantial pressure transients in the flow ducts, potentially resulting in brief backflow of the air and air/fuel mixture in the flow duct 4, the presence of the obturator disc 26 in the aperture 24 substantially prevents any fuel from being transferred from the rich passage to the lean passage.

In the carburettor described above, the partition 6 and thus the obturator plate extend horizontally and the pivotal shaft 22 extends vertically. It will, however, be appreciated that the partition 6 may extend vertically and the pivotal shaft 22 horizontally or that these two may extend at any respective angle between these two angles, though they will always be inclined to one another at substantially 90°. However, a change in orientation of the partition 6 may necessitate repositioning of the fuel jets so as to ensure that they still communicate with only one of the flow passages, namely the rich passage 8.

The invention claimed is:

1. A carburettor including a flow duct comprising rich and lean flow passages in parallel, through which, in use, air flows and which are separated by a substantially planar partition, at least one fuel jet communicating with the rich passage, the partition including a substantially circular aperture, and a butterfly valve mounted on a pivotal shaft and pivotable between a closed position, in which the flow duct is substantially closed, and an open position, in which the flow duct is substantially open, wherein the pivotal shaft extends transversely to the plane of the partition and the pivotal shaft carries a substantially circular obturator disc, whose diameter is substantially equal to that of the aperture and which is received in the aperture and substantially closes the aperture at all positions of the butterfly valve.

* * * * *